United States Patent [19]
Oblack

[11] Patent Number: 6,076,829
[45] Date of Patent: Jun. 20, 2000

[54] BALL THROWING APPARATUS AND METHOD

[76] Inventor: Mark Oblack, 900 SW. Cedarglade, Issaquah, Wash. 98027

[21] Appl. No.: 09/167,090

[22] Filed: Oct. 5, 1998

[51] Int. Cl.[7] ................................................. A63B 63/00
[52] U.S. Cl. .............................. 273/317; 124/5; 473/509
[58] Field of Search ..................... 473/415–451, 473/423, 424, 138, FOR 105, FOR 108, 235, 286, 509–510, 288–289; 273/371, 317; 124/4, 5

[56] References Cited

U.S. PATENT DOCUMENTS

| | | |
|---|---|---|
| 1,535,029 | 4/1925 | Murch . |
| 3,206,202 | 9/1965 | Evans ........................................... 124/4 |
| 3,428,036 | 2/1969 | Parker . |
| 3,589,349 | 6/1971 | Parker . |
| 3,841,292 | 10/1974 | Hoffman ..................................... 124/4 |
| 4,974,574 | 12/1990 | Cutlip ......................................... 124/4 |
| 5,129,650 | 7/1992 | Hayman ................................... 273/317 |
| 5,390,652 | 2/1995 | Minneman et al. ........................ 124/4 |
| 5,423,543 | 6/1995 | Tarrant ..................................... 473/286 |

*Primary Examiner*—Sebastiano Passaniti
*Assistant Examiner*—Mitra Aryanpour
*Attorney, Agent, or Firm*—Dean A. Craine

[57] ABSTRACT

These and other objects are met by a ball throwing apparatus including an elongated shaft with a half-spherical structure attached to or formed at its distal end designed to easily engage and pick up a ball for throwing without having to touch the ball with your hand or fingers. Also disclosed herein is a method of playing the game of fetch with an animal using the apparatus.

3 Claims, 3 Drawing Sheets

BALL THROWING APPARATUS AND METHOD

BACKGROUND OF THE INVENTION

1. Field of the Invention:

This invention relates to apparatus for throwing a ball, and more particularly, to such apparatus designed to play the game of fetch with an animal.

2. Description of the Related Art:

Many dogs are natural retrievers that enjoy retrieving objects such as sticks or balls. Unfortunately, the stick or ball is thrown at great distances for long periods of time, which makes a person's back and arm tired before the animal is ready to rest.

To reconcile this problem, some individuals have resorted to using a bat or tennis racket for hitting the ball great distances. Still other individuals use catapults or sporting devices intended for other sports, such as a jai-alai cesta.

In addition to one's back and arm becoming tired, another drawback of playing the game of fetch with a dog is having to physically pick up the ball with your hands. Typically, after a few throws, the ball is covered with dog saliva, which can be distasteful and unhealthy to touch.

A further drawback is the possibility of getting bit by the dog when initially picking the ball up off the ground after the dog has dropped it.

A ball throwing apparatus that overcomes all of the above drawbacks is needed.

SUMMARY OF THE INVENTION

It is an object of the present invention to provide a ball throwing apparatus.

It is another object of the present invention to provide such an apparatus that can be used to play the game of fetch with an animal without physically touching the ball with the hand or fingers.

It is a further object of the invention to provide such an apparatus that is safe, easy to use, and economical to manufacture.

It is still a further object to provide a method of playing the game of fetch with an animal.

These and other objects are met by a ball throwing apparatus including an elongated shaft with a ball engaging means attached or formed on the distal end of the shaft. The ball engaging means is designed to allow the user to easily engage and pick up a ball for throwing without having to touch the ball with one's hand or fingers. The ball engaging means is also designed to release the ball when the shaft is held near its proximal end and swung. Also, disclosed is a method of playing ball with an animal using the apparatus.

DESCRIPTION OF THE PREFERRED EMBODIMENT(S)

Figure 1:
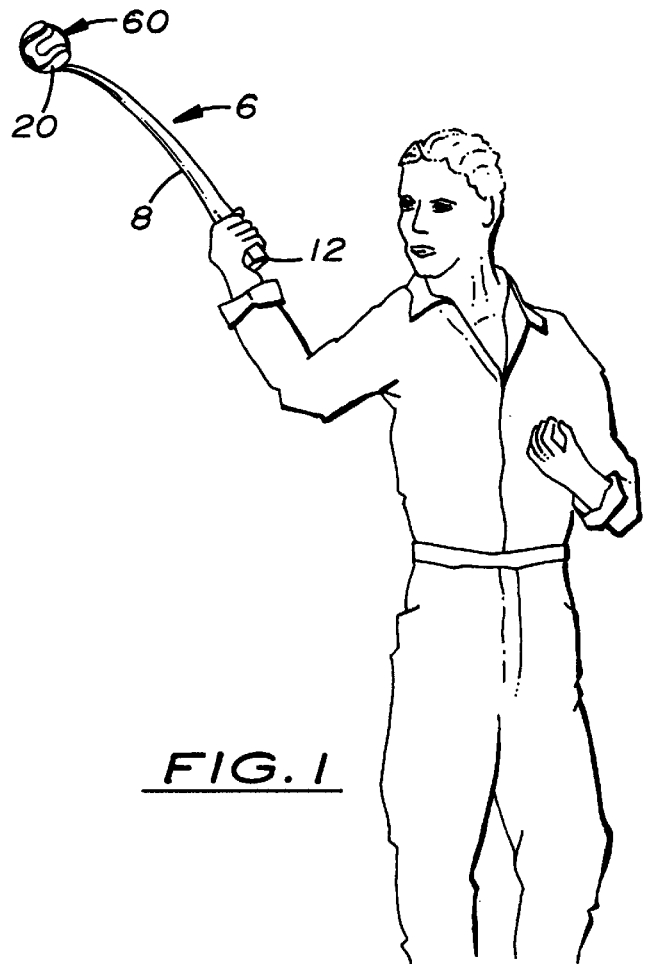
FIG. 1 is a perspective view showing an individual using the apparatus to throw a ball.
Figure 2:
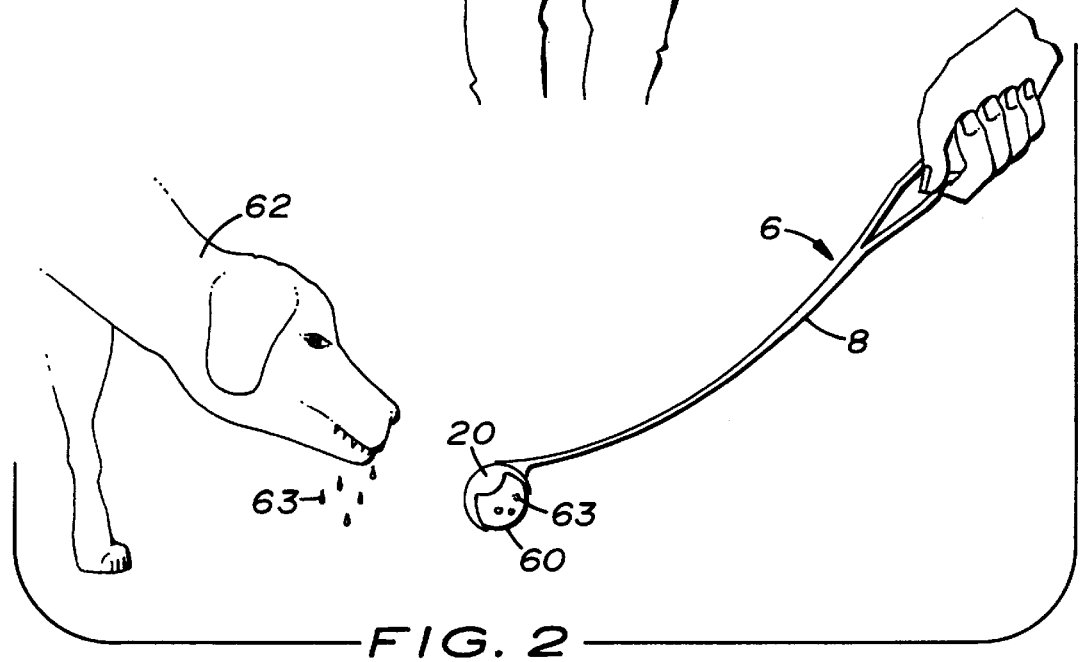
FIG. 2 is a perspective showing the apparatus being used to remove a ball from a position in front of a dog.
Figure 3:
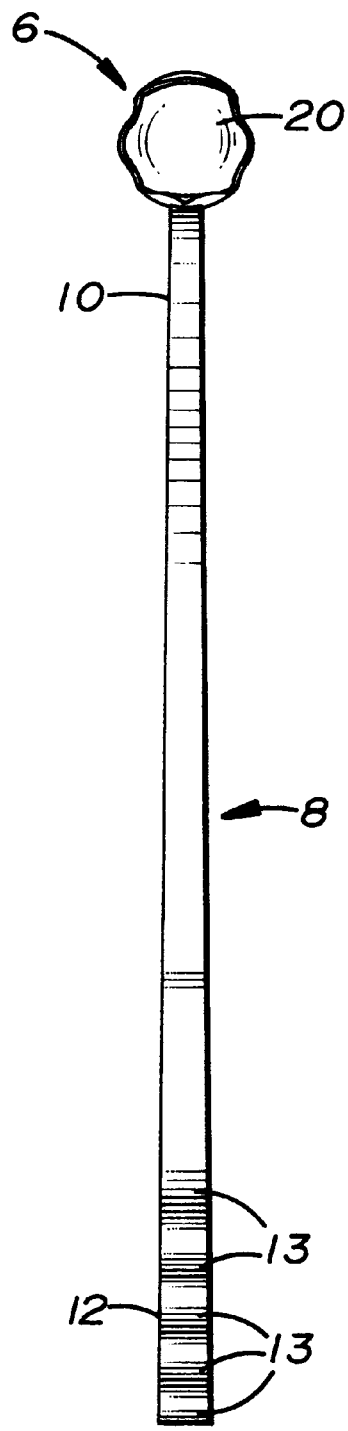
FIG. 3 is a front elevation view of the apparatus.

As shown in the accompanying FIGS. 1–6 a ball throwing apparatus 6 includes an elongated shaft 8 with a flexible upper neck portion 10 extending from a lower handle portion 12. Integrally formed over the distal end of the neck portion 10 is a half-spherical structure 20 which acts as a ball engaging means designed to snap-fit around a standard tennis ball 60.

The elongated shaft 8 has a sufficient length so that a ball 60 may be easily thrown great distances during use. The elongated shaft 8 also has sufficient length to enable the ball 60 to be easily and safely engaged, when resting adjacent to the aniimal, without touching the ball 60 or the animal's saliva 63 with one's hands or fingers as shown if FIG. 2.

Figure 4:
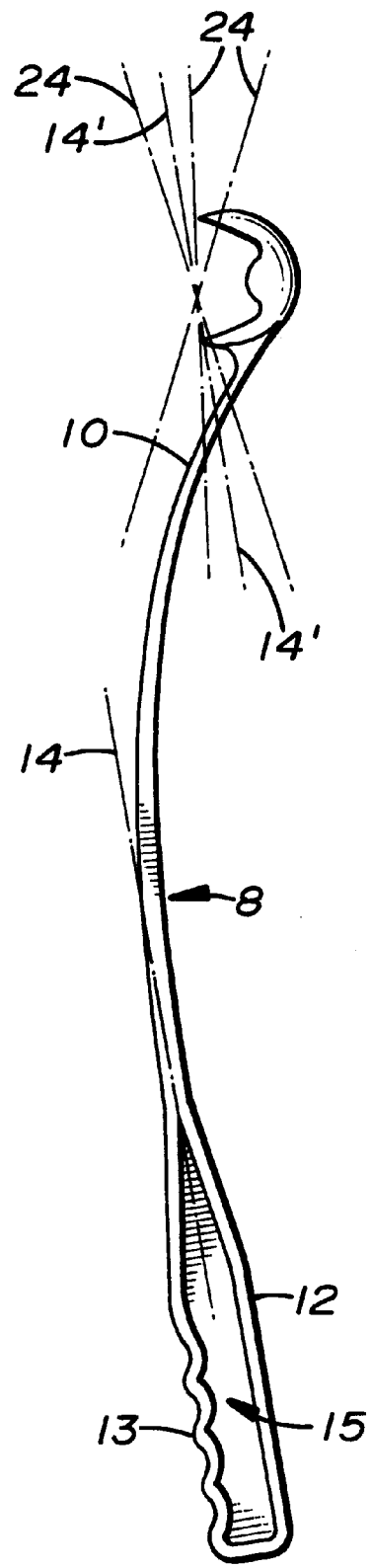
FIG. 4 is a side elevational view of the apparatus.
Figure 5:
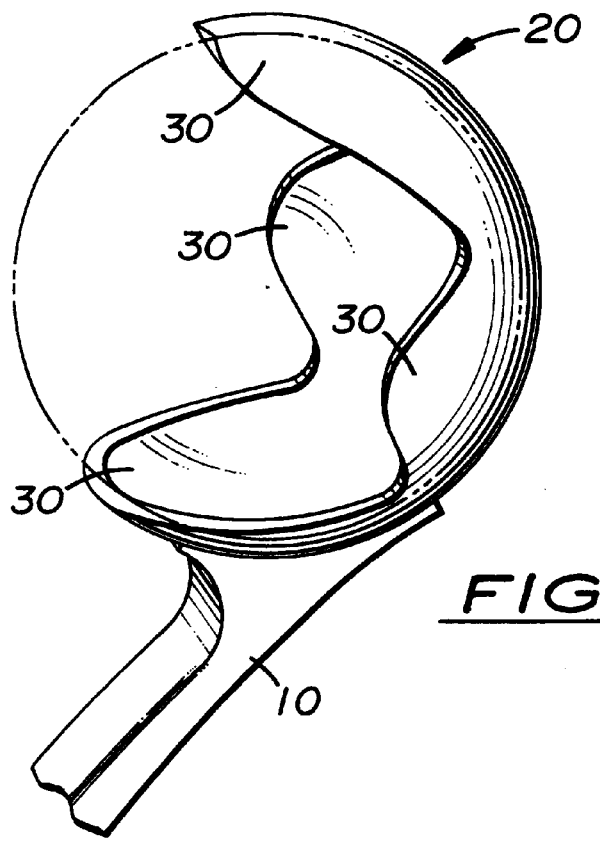
FIG. 5 is a perspective view showing a ball engaged in the head.
Figure 6:
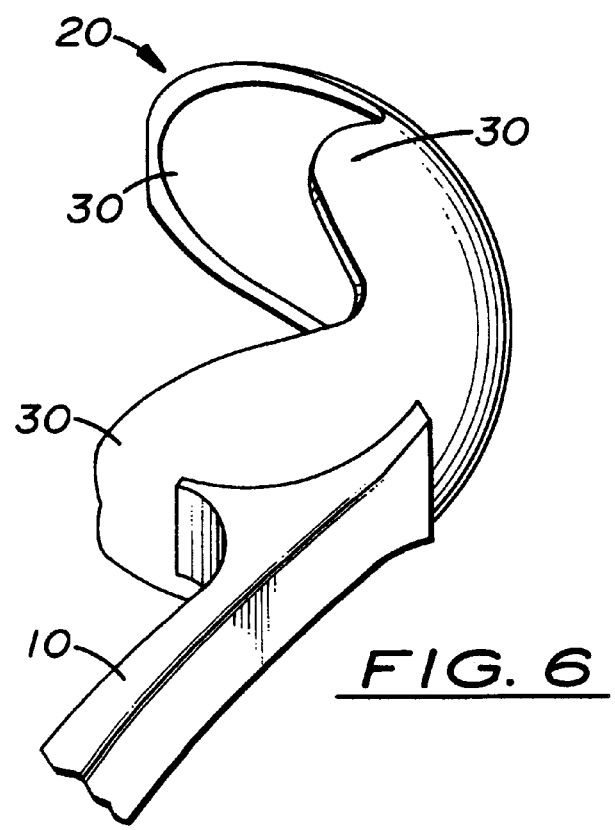
FIG. 6, is another perspective view, similar to the view shown in FIG. 4.

The shaft 8 is made of a single curved piece of resilient, lightweight material, such as polypropylene plastic, that has sufficient shape memory and flexibility. The upper neck portion 10 of the shaft 8 is stiff yet slightly flexible, acting as a spring when engaging the ball on the ground and when throwing the ball 60. In the preferred embodiment, the neck portion 10 is tapered as shown in FIG. 4.

When viewed from a side view (FIG. 4) the handle 12 is wider than the neck portion 10 and includes fmger gripping features 13 for easier handling. In the embodiment shown, the center portion 15 of the handle 12 is recessed on both sides, thereby reducing the overall weight of the shaft 8.

In the preferred embodiment, the half-spherical structure 20 has an inner radius equal to or slightly smaller than the outer radius of a tennis ball 60. Formed on the distal and proximal surfaces of the spherical structure 20 are a plurality of curved, equally spaced flexible leafs 30 that curve and substantially follow the outer radius of the ball 60. The leafs 30 extend past the mid-axis of the ball 60 when the ball is attached inside the half-spherical structure 20. When attaching a ball to the half-spherical structure 20, the half-spherical structure 20 is positioned above the ball and pressed downward. The leafs 30 bend outward to snap around the ball and hold it inside the half-spherical structure 20.

In the preferred embodiment, the shaft 8 is between 18 and 32 inches in length. The half-spherical structure 20 is integrally formed on the shaft 8 and is made of material identical to the shaft 8. The half-spherical structure 20 has an inside radius of approximately 1¼ inches, thereby enabling it to tightly receive a standard tennis ball which measures approximately 2¼ inches in diameter. As shown in FIG. 4, the shaft 8 is slightly curved in a rearward direction and the half-spherical structure 20 is aligned on the distal end of the shaft 8 so that the opening plane 24 of the half-spherical structure 20 is aligned approximately between 5 degrees forward and 33 degrees behind a line 14' parallel to the shaft's longitudinal axis 14. By slightly curving the shaft 8, the user is able to reach under the animals mouth while standing adjacent to the animal.

Using the above ball throwing apparatus 6, a method of playing the game of fetch with an animal is provided using the following steps:

a. selecting an elongated shaft with a ball engaging means disposed at its distal end, said ball engaging means capable of engaging a ball without the aid of one's hands or fingers, and capable of releasing a ball when said shaft is swung;

b. holding the proximal of said shaft;

c. attaching a ball to said ball engaging means while holding said shaft; and d. swinging said shaft while holding said proximal end thereby causing said ball to be released from said ball engaging means.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A ball throwing apparatus, comprising:
   a. an elongated shaft having a longitudinal axis and opposite distal and proximal ends; and
   b. a half-spherical structure integrally formed on said distal end of said elongated shaft, said half-spherical structure having an opening capable of snap-fitting and engaging a ball while holding said proximal end of said elongated shaft, said opening being aligned approximately 5 degrees forward and approximately 33 degrees behind said longitudinal axis of said elongated shaft, said half-spherical structure capable of releasing the ball when said elongated shaft is held near said proximal end and swung in a forward, circular path.

2. A ball throwing apparatus, as recited in claim 1, wherein said elongated shaft is rearwardly curved.

3. A method of playing the game of fetch, including the following steps:
   a. selecting an elongated shaft with opposite distal and proximal ends and having a half-spherical structure disposed at said distal end, said half-spherical structure capable of snap-fitting and engaging a ball without the aid of one's hands or fingers and capable of releasing a ball when said elongated shaft is swung in a forward direction;
   b. holding the proximal end of said elongated shaft;
   c. attaching a ball to said half-spherical structure while holding said proximal end of said elongated shaft; and
   d. sufficiently swinging said elongated shaft in a forward direction while holding said proximal end of said elongated shaft, thereby causing said ball to be released from said half-spherical structure.

\* \* \* \* \*

UNITED STATES PATENT AND TRADEMARK OFFICE
CERTIFICATE OF CORRECTION

PATENT NO. : 6,076,829
DATED : June 20, 2000
INVENTOR(S) : M. Oblack

It is certified that error appears in the above-identified patent and that said Letters Patent is hereby corrected as shown below:

Column 3,
Line 17, "aligned approxi-" should read -- aligned between approxi- --

Signed and Sealed this

Twenty-eighth Day of June, 2005

JON W. DUDAS
*Director of the United States Patent and Trademark Office*

(12) EX PARTE REEXAMINATION CERTIFICATE (7589th)
United States Patent
Oblack

(10) Number: US 6,076,829 C1
(45) Certificate Issued: Jul. 6, 2010

(54) BALL THROWING APPARATUS AND METHOD

(76) Inventor: Mark Oblack, 900 SW. Cedarglade, Issaquah, WA (US) 98027

Reexamination Request:
No. 90/009,157, May 21, 2008

Reexamination Certificate for:
Patent No.: 6,076,829
Issued: Jun. 20, 2000
Appl. No.: 09/167,090
Filed: Oct. 5, 1998

Certificate of Correction issued Jun. 28, 2005.

(51) Int. Cl.
*A63B 63/00* (2006.01)

(52) U.S. Cl. .............................. 273/317; 124/5; 473/509
(58) Field of Classification Search .................. None
See application file for complete search history.

(56) References Cited

U.S. PATENT DOCUMENTS

| | | | | |
|---|---|---|---|---|
| 1,535,029 A | * | 4/1925 | Murch ............................ | 124/5 |
| 1,585,446 A | * | 5/1926 | Warwick ........................ | 124/5 |
| 1,994,207 A | | 3/1935 | Ahles | |
| 2,810,957 A | * | 10/1957 | Nelson ......................... | 30/324 |
| 3,428,036 A | * | 2/1969 | Parker ........................... | 124/5 |
| 3,442,544 A | * | 5/1969 | Faber ........................... | 294/19.2 |
| 3,589,349 A | * | 6/1971 | Parker ........................... | 124/5 |
| 3,611,996 A | * | 10/1971 | Wegner ........................ | 119/707 |
| D239,812 S | * | 5/1976 | Gould .......................... | D8/14 |
| 4,085,936 A | | 4/1978 | Patterson | |
| D284,342 S | * | 6/1986 | Campbell ................. | D10/46.2 |
| 4,974,574 A | | 12/1990 | Cutlip | |
| 4,995,374 A | * | 2/1991 | Black ........................... | 124/54 |
| D325,612 S | * | 4/1992 | Longo ....................... | D21/725 |
| D352,641 S | * | 11/1994 | Coquereau et al. ............ | D7/688 |
| 5,437,488 A | * | 8/1995 | Richmond et al. .......... | 294/19.2 |
| D402,167 S | * | 12/1998 | Durbin ......................... | D7/692 |
| D405,660 S | * | 2/1999 | Hansen et al. ............... | D7/688 |
| D480,280 S | * | 10/2003 | Schulein ...................... | D7/692 |

* cited by examiner

*Primary Examiner*—Glenn K. Dawson

(57) ABSTRACT

These and other objects are met by a ball throwing apparatus including an elongated shaft with a half-spherical structure attached to or formed at its distal end designed to easily engage and pick up a ball for throwing without having to touch the ball with your hand or fingers. Also disclosed herein is a method of playing the game of fetch with an animal using the apparatus.

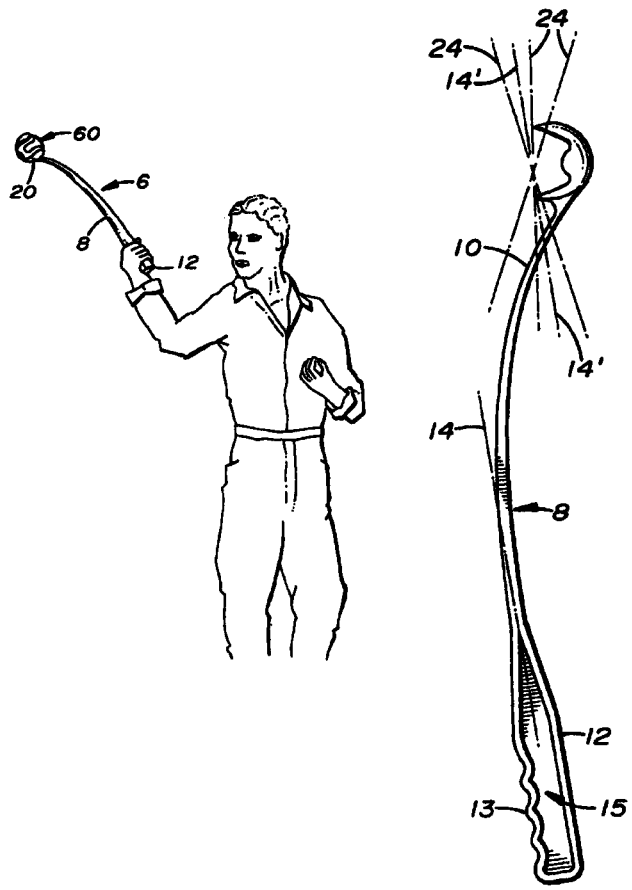

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *